United States Patent
Raindel et al.

(10) Patent No.: US 10,120,832 B2
(45) Date of Patent: Nov. 6, 2018

(54) DIRECT ACCESS TO LOCAL MEMORY IN A PCI-E DEVICE

(71) Applicant: MELLANOX TECHNOLOGIES LTD., Yokneam (IL)

(72) Inventors: Shachar Raindel, Haifa (IL); Idan Burstein, Karmiel (IL); Noam Bloch, Bat Shlomo (IL); Shlomo Raikin, Kibutz Yassur (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 601 days.

(21) Appl. No.: 14/721,009

(22) Filed: May 26, 2015

(65) Prior Publication Data
US 2015/0347349 A1     Dec. 3, 2015

Related U.S. Application Data
(60) Provisional application No. 62/003,089, filed on May 27, 2014.

(51) Int. Cl.
G06F 15/173     (2006.01)
G06F 13/28      (2006.01)
G06F 13/42      (2006.01)

(52) U.S. Cl.
CPC ........ *G06F 15/17331* (2013.01); *G06F 13/28* (2013.01); *G06F 13/4221* (2013.01)

(58) Field of Classification Search
CPC . G06F 13/28; G06F 13/4221; G06F 15/17331
See application file for complete search history.

(56) References Cited

U.S. PATENT DOCUMENTS

| | | |
|---|---|---|
| 5,822,749 A | 10/1998 | Agarwal |
| 5,845,329 A | 12/1998 | Onishi et al. |
| 6,321,276 B1 | 11/2001 | Forin |
| 6,629,166 B1 | 9/2003 | Grun |
| 6,766,467 B1 | 7/2004 | Neal et al. |
| 6,789,143 B2 | 9/2004 | Craddock et al. |
| 6,981,027 B1 | 12/2005 | Gallo et al. |
| 7,171,484 B1 | 1/2007 | Krause et al. |
| 7,225,287 B2 | 5/2007 | Wooten |
| 7,263,103 B2 | 8/2007 | Kagan et al. |

(Continued)

OTHER PUBLICATIONS

"Linux kernel enable the IOMMU—input/output memory management unit support", 2 pages, Oct. 15, 2007 http://www.cyberciti.biz/tips/howto-turn-on-linux-software-iommu-support.html.

(Continued)

*Primary Examiner* — Nimesh G Patel
(74) *Attorney, Agent, or Firm* — D. Kligler IP Services Ltd.

(57) ABSTRACT

A method includes communicating between at least first and second devices over a bus in accordance with a bus address space, including providing direct access over the bus to a local address space of the first device by mapping at least some of the addresses of the local address space to the bus address space. In response to indicating, by the first device or the second device, that the second device requires to access a local address in the local address space that is not currently mapped to the bus address space, the local address is mapped to the bus address space, and the local address is accessed directly, by the second device, using the mapping.

28 Claims, 4 Drawing Sheets

(56) References Cited

U.S. PATENT DOCUMENTS

| | | | |
|---|---|---|---|
| 7,299,266 | B2 | 11/2007 | Boyd et al. |
| 7,464,198 | B2 | 12/2008 | Martinez et al. |
| 7,475,398 | B2 | 1/2009 | Nunoe |
| 7,548,999 | B2 | 6/2009 | Haertel et al. |
| 7,623,134 | B1 | 11/2009 | Danilak |
| 7,663,635 | B2 | 2/2010 | Rogers et al. |
| 7,721,068 | B2 | 5/2010 | Lowe et al. |
| 7,752,417 | B2 | 7/2010 | Manczak et al. |
| 7,809,923 | B2 | 10/2010 | Hummel et al. |
| 7,844,746 | B2 | 11/2010 | Arimilli et al. |
| 8,001,592 | B2 | 8/2011 | Hatakeyama |
| 8,010,763 | B2 | 8/2011 | Armstrong et al. |
| 8,051,212 | B2 | 11/2011 | Kagan et al. |
| 8,086,765 | B2 | 12/2011 | Turner et al. |
| 8,249,089 | B2 | 8/2012 | Saripalli |
| 8,255,475 | B2 | 8/2012 | Kagan et al. |
| 8,364,910 | B2 | 1/2013 | Wilkerson et al. |
| 8,447,904 | B2 | 5/2013 | Riddoch |
| 8,578,129 | B2 | 11/2013 | Blinzer et al. |
| 8,593,472 | B1 | 11/2013 | Diard |
| 8,645,663 | B2 | 2/2014 | Kagan et al. |
| 8,650,342 | B2 | 2/2014 | Brahmaroutu |
| 8,711,418 | B2 | 4/2014 | Cho |
| 8,745,276 | B2 | 6/2014 | Bloch et al. |
| 8,914,458 | B2 | 12/2014 | Raindel et al. |
| 9,043,513 | B2 | 5/2015 | Perego et al. |
| 9,703,494 | B1* | 7/2017 | Rajwade ............... G06F 3/0611 |
| 2002/0152327 | A1 | 10/2002 | Kagan et al. |
| 2003/0046530 | A1 | 3/2003 | Poznanovic |
| 2004/0107304 | A1 | 6/2004 | Grun |
| 2004/0221128 | A1 | 11/2004 | Beecroft et al. |
| 2004/0230979 | A1 | 11/2004 | Beecroft et al. |
| 2007/0011429 | A1 | 1/2007 | Sangili et al. |
| 2007/0061492 | A1 | 3/2007 | Van Riel |
| 2007/0157001 | A1 | 7/2007 | Ritzau |
| 2007/0157011 | A1 | 7/2007 | Kumar et al. |
| 2008/0005495 | A1 | 1/2008 | Lowe et al. |
| 2008/0126509 | A1 | 5/2008 | Subramanian et al. |
| 2008/0133709 | A1 | 6/2008 | Aloni et al. |
| 2008/0222397 | A1 | 9/2008 | Wilkerson et al. |
| 2009/0138574 | A1 | 5/2009 | Hui et al. |
| 2010/0077397 | A1 | 3/2010 | Ooi et al. |
| 2010/0095085 | A1 | 4/2010 | Hummel et al. |
| 2010/0223262 | A1 | 9/2010 | Krylov et al. |
| 2011/0023027 | A1 | 1/2011 | Kegel et al. |
| 2011/0040920 | A1* | 2/2011 | Chou ..................... G06F 13/28 710/316 |
| 2011/0173396 | A1 | 7/2011 | Sugumar et al. |
| 2012/0210095 | A1* | 8/2012 | Nellans .................. G06F 12/10 711/206 |
| 2012/0317122 | A1 | 12/2012 | Baptist et al. |
| 2012/0331243 | A1 | 12/2012 | Aho et al. |
| 2013/0145085 | A1 | 6/2013 | Yu et al. |
| 2013/0166922 | A1 | 6/2013 | Wong et al. |
| 2013/0311746 | A1 | 11/2013 | Raindel et al. |
| 2014/0055467 | A1 | 2/2014 | Bittner et al. |
| 2014/0008945 | A1 | 3/2014 | Eran et al. |
| 2014/0075060 | A1 | 3/2014 | Sharp et al. |
| 2014/0122828 | A1 | 5/2014 | Kagan et al. |
| 2014/0164716 | A1 | 6/2014 | Glasco et al. |
| 2014/0204102 | A1 | 7/2014 | Rath et al. |
| 2015/0058533 | A1* | 2/2015 | El-Batal ............... G06F 13/385 711/103 |
| 2015/0206277 | A1* | 7/2015 | Rao ....................... G06F 9/5016 345/520 |
| 2017/0091981 | A1* | 3/2017 | Herr ...................... G06T 15/005 |
| 2017/0147507 | A1* | 5/2017 | Horii ................... G06F 12/1081 |

OTHER PUBLICATIONS

"MPI: A Message-Passing Interface Standard", Version 2.2, Message Passing Interface Forum, 647 pages, Sep. 4, 2009.
InfiniBand Trade Association, "InfiniBandTM Architecture Specification", vol. 1, Release 1.2.1, 1727 pages, Nov. 2007.
Shah et al., "Direct Data Placement over Reliable Transports", IETF Network Working Group, RFC 5041, 38 pages, Oct. 2007.
Culley et al., "Marker PDU Aligned Framing for TCP Specification", IETF Network Working Group, RFC 5044, 74 pages, Oct. 2007.
Solomon R., "IOV 1.1 Update and Overview", LSI Corporation, Member I/O Virtualization Workgroup, PCI-SIG, PCI Express, 45 pages, 2010.
Hummel M., "IO Memory Management Hardware Goes Mainstream", AMD Fellow, Computation Products Group, Microsoft WinHEC, 7 pages, 2006.
Welsh et al., "Incorporating Memory Management into User-Level Network Interfaces", Department of Computer Science, Cornell University, Technical Report TR97-1620, 10 pages, Feb. 13, 1997.
Kagan et al., U.S. Appl. No. 14/215,099, filed Mar. 17, 2014.
An EaseUS.COM article "How iSCSI Works", 1 page, 2007 (http://www.easeus.com/resource/drive/iscsi-drive.htm).
Shainer, G., "Interconnect Your Future", 2nd Annual MVAPICH User Group (MUG) Meeting, 28 pages, Aug. 2014.
PCI Express® Base Specification, Revision 3.0, 860 pages, Nov. 10, 2010.
Kagan et al., U.S. Appl. No. 14/215,097, filed Mar. 17, 2014.
NVIDIA Corporation, "NVIDIA GPUDirect", 5 pages, year 2014.
Kraus, J., "Introduction to CUDA-aware MPI and NVIDIA GPUDirect™", 40 pages, Mar. 18, 2013.
PCI Express® specifications., "Address Translation Services", revision 1.1, 54 pages, Jan. 26, 2009.

* cited by examiner

DIRECT ACCESS TO LOCAL MEMORY IN A PCI-E DEVICE

CROSS-REFERENCE TO RELATED APPLICATIONS

This application claims the benefit of U.S. Provisional Patent Application 62/003,089, filed May 27, 2014, whose disclosure is incorporated herein by reference.

FIELD OF THE INVENTION

The present invention relates generally to computer systems, and particularly to methods and systems for direct accessing the local memory of a peripheral device over PCIe.

BACKGROUND OF THE INVENTION

In various computer systems, peripheral devices communicate over a PCI or PCI-Express (PCIe) bus. Such peripheral devices may include, for example, a solid state drive (SSD) and various accelerator modules such as a graphics processing unit (GPU). Methods for directly accessing a local memory of a device are known in the art. For example, U.S. Pat. No. 7,623,134, whose disclosure is incorporated herein by reference, describes a technique for processing address page requests in a GPU system that is implementing a virtual memory model. A hardware-based page fault manager included in the GPU system intercepts page faults otherwise processed by a software-based page fault manager executing on a host CPU. The hardware-based page fault manager in the GPU includes a DMA engine capable of reading and writing pages between the system memory and a frame buffer memory in the GPU without involving the CPU or operating system.

As another example, U.S. Patent Application Publication 2014/0055467, whose disclosure is incorporated herein by reference, describes a system that may include a Graphics Processing Unit (GPU) and a Field Programmable Gate Array (FPGA). The system may further include a bus interface that is external to the FPGA, and that is configured to transfer data directly between the GPU and the FPGA without storing the data in a memory of a central processing unit (CPU) as an intermediary operation.

U.S. Patent Application Publication 2014/0075060, whose disclosure is incorporated herein by reference, proposes techniques for demand paging for an IO device (e.g., a GPU) that utilize pre-fetch and pre-back notification event signaling to reduce latency associated with demand paging. Page faults are limited by performing the demand paging operations prior to the IO device actually requesting unbacked memory.

Technologies that enable direct communication between remote GPUs include, for example, PeerDirect® and GPU-Direct® RDMA, as presented, for example in a presentation titled "Interconnect Your Future," by Gilad Shainer, at the 2nd Annual MVAPICH User Group (MUG) Meeting, August, 2014, which is incorporated herein by reference.

SUMMARY OF THE INVENTION

An embodiment of the present invention that is described herein provides a method, including communicating between at least first and second devices over a bus in accordance with a bus address space, including providing direct access over the bus to a local address space of the first device by mapping at least some of the addresses of the local address space to the bus address space. In response to detecting, by the first device or the second device, that the second device requires to access a local address in the local address space that is not currently mapped to the bus address space, the local address is mapped to the bus address space, and the local address is accessed directly, by the second device, using the mapping.

In some embodiments, mapping the addresses includes associating between the addresses and respective bus addresses in the bus address space. In other embodiments, mapping the addresses includes re-mapping one or more addresses that were previously mapped to the bus address space. In yet other embodiments, accessing the local address includes translating an address in the bus address space that is mapped to the local address.

In an embodiment, the second device uses a second address space that includes a second address corresponding to a respective intermediate address in the bus address space that is mapped to the local address, and accessing the local address includes translating the second address to the intermediate address and translating the intermediate address to the local address. In another embodiment, translating at least one of the second address and the intermediate address includes holding a respective mapping table. In yet another embodiment, translating at least one of the second address and the intermediate address includes requesting translation from an address translation service (ATS).

In some embodiments, accessing the local address includes sending, over the bus, a command from the first device to the second device indicating that the address is mapped and ready for access. In other embodiments, the second device includes a network adapter that communicates with a peer network adapter over a communication network, and the peer network adapter communicates with the first device using remote direct memory access (RDMA). In yet other embodiments, the first device includes a first local memory that is accessed using the local address space, and second device comprises a second local memory, and accessing the local address includes transferring data directly between the first local memory and the second local memory.

There is additionally provided, in accordance with an embodiment of the present invention, an apparatus that includes first and second devices, which are configured to communicate over a bus in accordance with a bus address space. The first device is configured to provide direct access over the bus to a local address space by mapping addresses in the local address space to the bus address space. In response to detecting by the first device or the second device that the second device requires to access a local address in the local memory that is not currently mapped to the bus address space, the first device is configured to map the local address to the bus address space, and the second device is configured to access the local address directly.

There is additionally provided, in accordance with an embodiment of the present invention, a method including communicating between a first device and a second device over a bus in accordance with a bus address space. The first device stores data in a storage area in accordance with a logical address space and provides direct access over the bus to a local memory by mapping at least some of the addresses of the local memory to the bus address space. In response to indicating, by the second device, that the second device requires to access a logical address that stores requested data that resides in the storage area and is not currently stored in the local memory, the requested data is fetched from the logical address to a local address of the local memory that is mapped to the bus address space, and the local address is accessed directly, by the second device, using the mapping.

In some embodiments, fetching the requested data includes indicating to the second device a physical address of the bus address space corresponding to the local address, when the requested data is available for read in the local address. In other embodiments, fetching the requested data includes writing, prior to fetching the requested data, data that is currently stored in the local address to the storage area. In yet other embodiments, mapping the addresses of the local memory includes fetching data from a given logical address of the storage area to the local address and associating between the local address and the given logical address. In an embodiment, the first device comprises a storage device, and the storage area comprises a nonvolatile memory.

There is additionally provided, in accordance with an embodiment of the present invention, an apparatus that includes first and second devices, which are configured to communicate over a bus in accordance with a bus address space. The first device is configured to store data in a storage area in accordance with a logical address space and to provide direct access over the bus to a local memory by mapping at least some of the addresses of the local memory to the bus address space. In response to indicating, by the second device, that the second device requires to access a logical address that stores requested data that resides on the storage area and is not currently stored in the local memory, the first device is configured to fetch the requested data from the logical address to a local address of the local memory that is mapped to the bus address space, and the second device is configured to access the local address directly, using the mapping.

The present invention will be more fully understood from the following detailed description of the embodiments thereof, taken together with the drawings in which:

DETAILED DESCRIPTION OF EMBODIMENTS

Overview

Figure 1:
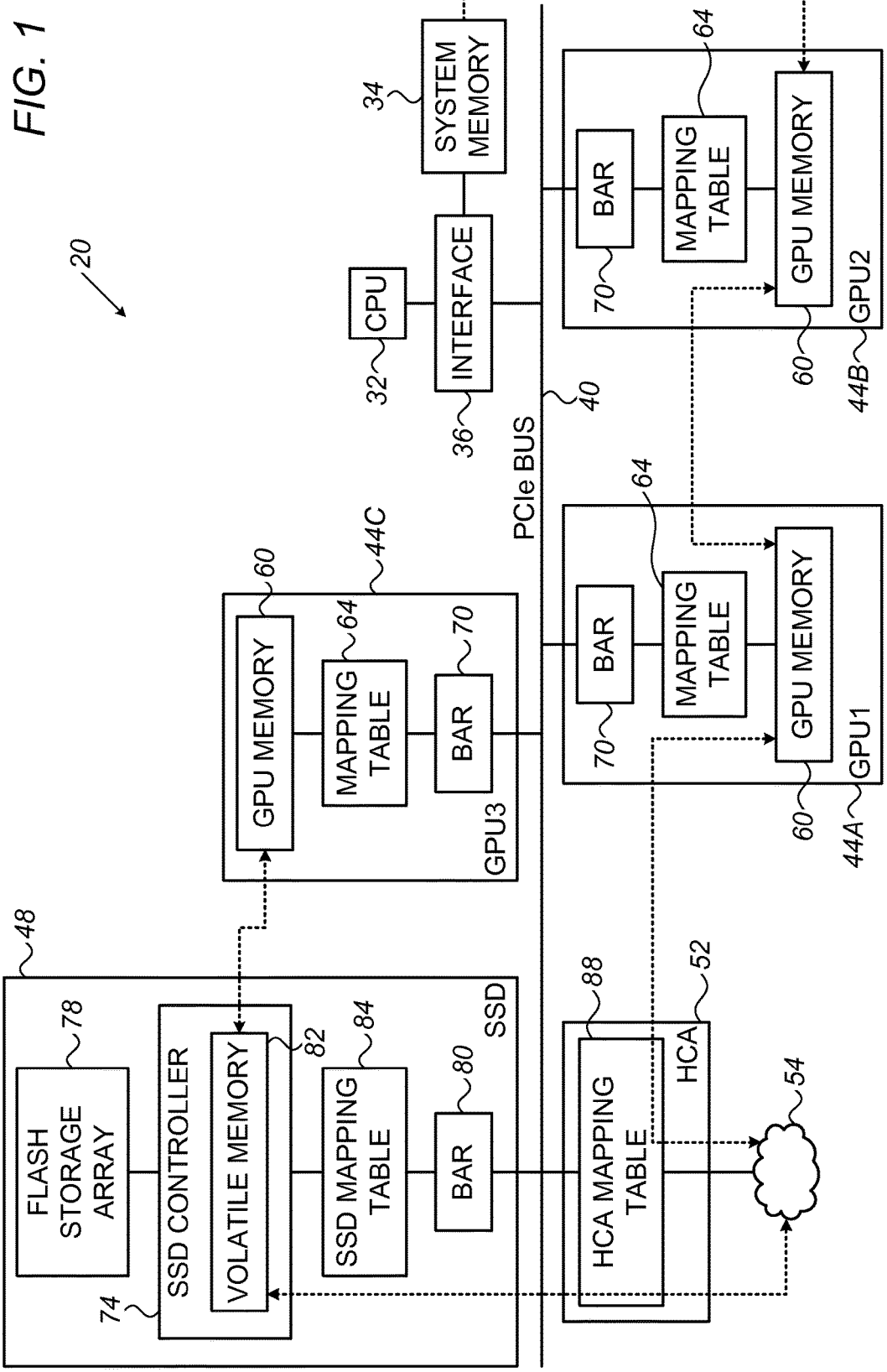
FIG. 1 is a block diagram that schematically illustrates a computer system having multiple devices communicating via PCIe, in accordance with an embodiment that is described herein.

Various computing systems comprise a central processing unit (CPU) and multiple peripheral devices that interconnect using a bus. The description that follows refers mainly to a PCIe bus, but the disclosed techniques apply to other interconnect configurations such as PCI, AXI, NVLINK, AMBA, HyperTransport and QPI. Embodiments of the present invention that are described herein provide improved methods and systems for accessing the local memory of a device over PCIe and other suitable bus types. In the context of the present disclosure, the term "direct access" means that data can be transferred between devices, over PCIe, with no involvement of the software running on the CPU in the data plane. Devices interconnecting via PCIe are referred to herein as PCIe devices.

In accordance with the PCIe specifications, PCIe devices can communicate using a common address space that is associated with the bus. This address space is referred to herein as a bus address space or PCIe address space. In some embodiments, PCIe devices use addresses in an internal address space that may be different from the PCIe address space.

The PCIe specifications define a mechanism by which a PCIe device may expose its local memory (or part thereof) to the bus and thus enable the CPU or other devices attached to the bus to access its memory directly. Typically, each PCIe device is assigned a dedicated region in the PCIe address space that is referred to as a PCI base address register (BAR). In addition, addresses that the device exposes are mapped to respective addresses in the PCI BAR.

In some embodiments, the translation between addresses of the PCIe address space and the internal address space is implemented using a mapping table in the device. Alternatively, the device may carry out the translation using an input/output memory management unit (IOMMU) or an address translation service (ATS).

In some practical situations, a device is unable to expose its entire logical address space to the bus simultaneously, due to various reasons such as limitations in the BIOS and/or firmware, or due to long access times to parts of the address space. For example, in an SSD, to avoid blocking the PCIe bus during periods in which the SSD fetches data from the flash storage, the SSD comprises a relatively small RAM buffer that caches data stored in the flash storage, and exposes to the PCIe bus only the RAM buffer rather than the flash storage. As a result of exposing parts of the local memory, only the local memory addresses that are exposed at a given time are accessible to other devices. In the disclosed techniques, the mapping between the PCI BAR allocated to the device and the local addresses or the network visible addresses is updated dynamically so as to expose different memory locations as requested. In an embodiment, addresses that are currently not mapped to the PCIe bus are marked as invalid (or inaccessible) addresses.

In an embodiment, an HCA attempts to read data from an SSD that exposes its entire RAM buffer to the PCIe bus. When the HCA requests to read data is not currently available in the RAM buffer, the SSD fetches the missing data to the RAM buffer and the HCA updates its mapping tables accordingly.

In some embodiments, when accessing an address that is currently not exposed to the PCIe bus, the accessing device requests the CPU to update the related mapping tables, so as to include the required address. In other embodiments, the accessing device may send a message for updating the mapping tables directly to the peer device, without involving the CPU. Such a message may comprise, for example an ATS-PRI (Address Translation Service-Page Request Interface) message, in accordance with the PCIe specifications.

In an embodiment, the CPU updates the mapping tables in the accessing and target devices by reserving one or more additional addresses in each of the accessing and target devices, and mapping the added addresses to available physical addresses in the PCI BAR. In some embodiments, the target device does not necessarily comprise a mapping table. In such embodiments, only the mapping table in the accessing device is updated. In another embodiment, the CPU evicts one or more addresses that are currently mapped to the PCI BAR before mapping additional addresses to the PCI BAR. Updating the mapping tables can be carried out by the CPU, the devices involved or in combination of the CPU and devices.

In some embodiments, a PCIe device (e.g., a GPU) manages the direct access to its local memory. The device allocates a memory buffer to be accessed and maps the buffer addresses to respective addresses of the PCI BAR as described above. The device then sends a command to another device (e.g., a storage device or a network adapter) to access the memory buffer directly. When the transaction is completed, the PCIe device receives from the other device a respective indication and tears the buffer mapping down. When the other device comprises a network adapter, the PCIe device may send to the network adapter a command to update the mapping tables in the network adapter to include the PCI BAR mapped to the memory buffer.

The disclosed techniques can be utilized in various applications such as direct data transfer between PCIe devices such as GPUs, remote access to the GPU memory or to a storage device via a network adapter, and the like. By dynamically exposing different parts of the device's local memory, the entire local memory can be accessed with minimal latency and low complexity.

System Description

FIG. 1 is a block diagram that schematically illustrates a computer system 20 having multiple devices communicating via PCIe, in accordance with an embodiment that is described herein. Computer system 20 comprises a CPU 32 and a system memory 34 that are interconnected using a bus interface 36. Bus interface 36 additionally connects CPU 32 and system memory 34 to a bus 40 to which several peripheral devices are also connected. In some embodiments, CPU 32 runs a program such as a program that starts on system boot, an operating system or a device driver that manages the allocation of bus 40 resources and peripheral device configuration in system 20.

In system 20, bus 40 comprises a PCI-Express (PCIe) bus. Alternatively, bus 40 may comprise other suitable interconnects or buses such as PCI. Peripheral devices communicating over bus 40 are also referred to herein as PCIe devices. The PCIe bus is specified, for example, in "PCI Express® Base Specification," Revision 3.0, Nov. 10, 2010, which is incorporated herein by reference.

System 20 may comprise one or more peripheral devices that perform various tasks for the system. In the present example, the peripheral devices connecting to bus 40 comprise multiple graphics processing units (GPUs) 44, a solid state drive (SSD) 48 and a host channel adapter (HCA) 52 that connects to a communication network 54. Alternatively, any network adapter other than HCA 52 such as a network interface controller (NIC) can also be used. In some embodiments, a peripheral device may comprise an accelerator or other co-processor that is implemented in FPGA (not shown in the figure) and is attached to the PCIe bus.

Communication over bus 40 is carried out in accordance with a bus address space that is also referred to herein as a physical address space or a PCIe address space. An address within the bus address space is also referred to herein as a bus address, physical address or PCIe address. For each device on the PCIe bus a range of addresses is allocated in this physical address space. By allocating different ranges in the bus address space per device, the PCIe devices can be addressed and accessed individually. The range of physical addresses is also referred to herein as a PCI BAR. Typically, the PCI BAR allocated to a given PCIe device is determined at initialization, e.g., by the BIOS program, and does not change over time.

In some embodiments, the PCIe device comprises a byte-addressable data storage, such as RAM or flash, which the device may expose for direct access over the PCI BAR. Usually, the device is capable of some form of mapping physical addresses of the PCIe bus to respective parts of the addressable data storage. For example, a PCIe device may use a virtual address space that is larger than the physical address space of bus 40. Alternatively, a PCIe device may access an internal memory using an address space that is smaller than the address bus space. Note that noncontiguous ranges in the device's address space can be mapped to a contiguous PCI BAR. When accessing the local memory of a PCIe device over bus 40, at a memory address that is mapped to a respective physical address, the PCIe device translates this physical address to the memory address.

PCIe devices typically support one or more internal logical functions and may use an internal address space (or spaces) for the logical functions' memory accesses. For example, in an HCA, network transactions carry addresses that belong to a virtual address space and are defined by respective memory keys. This virtual address space is different from the physical address space of bus 40. Again, various mapping mechanisms may be used to convert addresses in this virtual address space into physical bus addresses when executing DMA requests.

Note that in both cases, i.e., 1) translation from physical PCIe addresses to the local address space of the target device and 2) translation from logical addresses of the requesting device to DMA target (PCIe bus) addresses, parts of the address space might not be mapped. Methods for accessing addresses that are currently not mapped to the PCIe bus are described in detail below. In some embodiments, a PCIe device such as a GPU, contains, in addition to a byte-addressable data storage, one or more logical functions. In such embodiments, accessing both the storage requires address translation when accessed by either the external PCIe device or by the internal logical functions. In these embodiments, the outcome of some of the translations may comprise a pointer to the local memory of the device, while other translations result in respective PCIe DMA transactions.

Each GPU 44 in FIG. 1 comprises a local GPU memory 60, which is sometimes referred to as a frame buffer. Memory 60 typically comprises a volatile memory such as a random access memory (RAM) having storage capacity on the order of several Gbytes. In some embodiments, GPU 44 comprises a mapping table 64 for translating between addresses in the internal address space that the GPU uses for accessing GPU memory 60, and respective physical addresses of bus 40.

In some embodiments the GPU comprises two mapping tables. The first mapping table converts physical bus addresses to respective addresses in the GPU memory. The second mapping table translates addresses for memory accesses done by the logical functions of the GPU into either addresses in the GPU memory or physical bus addresses.

Each GPU 44 additionally comprises a PCI base address register (BAR) 70. BAR 70 defines an address range allocated to the GPU in the physical address space, i.e., the PCI BAR allocated to the device. At a given time, at least some of the physical addresses in the PCI BAR are associated with respective addresses in the internal GPU address space (e.g., via mapping table 64). In some embodiments, the entire GPU address space is mapped to a respective PCI BAR. In other embodiments, only a partial subset of the GPU address space is mapped to the PCI BAR. For example, the GPU address space may be larger than the maximal address space size supported by BAR 70. BARs in other PCIe devices, as will be described below, have similar functionality. Some parts of the BARs may be used for other purposes, such as, for example, for implementing a MMIO interface to the PCIe device logic.

SSD 48 comprises a memory controller 74, a nonvolatile memory 78 and a BAR 80. Memory controller 74 manages data storage in nonvolatile memory 78, which comprises, for example, a flash storage array. SSD controller 74 comprises a volatile memory 82 that serves, among other tasks, for managing the storage in nonvolatile memory 78 and as a buffer or cache memory. An SSD mapping table 84 translates between addresses in the internal address space used by SSD 48 and respective physical addresses in the allocated PCI BAR. BAR 80 holds the definition of the PCI BAR allocated to the SSD.

Although in the description that follows we refer to memory 82 as a volatile memory, in alternative embodiments other memory types can be used, such as, for example, a phase-change memory (PCM), which is a nonvolatile memory type.

In some embodiments, the SSD exposes volatile memory to the PCIe bus using a 1:1 mapping, and therefore mapping table 84 is not required. In some embodiments, a remote device (e.g., a HCA) attempts to read data from the SSD that is not available in volatile memory 82. In such embodiments, the SSD fetches the missing data from array 78 to volatile memory 82, and the HCA updates its mapping table accordingly. In some embodiments, SSD mapping table 84 does not reside physically on the SSD, and its functionality is implemented by other elements outside the SSD (e.g., by the CPU).

As noted above, system 20 connects to communication network via HCA 52. In an embodiment, HCA 52 operates in accordance with a virtual address space. In other words, a remote HCA that communicates with PCIe devices of system 20 is unaware of the actual addresses used within the devices. CPU 32 and HCA 52 may share the same virtual address space or alternatively use different address spaces. HCA 52 comprises an HCA mapping table 88 for translating between the virtual address and physical addresses in the respective allocated PCI BAR.

Network 54 may comprise, for example, an InfiniBand network or an Ethernet network. In alternative embodiments, network 54 may comprise any suitable type of network having any suitable infrastructure and related protocols. The network infrastructure may comprise, for example, several interconnected subnets, each comprising switches, routers and/or any other suitable network element. Network 54 may comprise a local or a wide area network (WAN/LAN), a wireless network, or a combination of such networks. Additionally, the network may be a packet network such as IP, e.g., with TCP as the transport protocol, InfiniBand, or Ethernet network, delivering information at any suitable data rate.

As will be described in detail below, the architecture of system 20, together with the embodiments disclosed herein enable a PCIe device to directly access the local memory of another PCIe device over bus 40. In some of the disclosed embodiments, when attempting to access an address of the local address space that is currently not mapped to the physical bus, the device can map this address to the PCI BAR so as to make the address accessible.

As demonstrated in FIG. 1, direct data transfer between PCIe devices with dynamic mapping of device's local addresses to the physical address space can be used in various applications. Example such applications are listed herein:

A network adapter that communicates with a peer network adapter over a communication network provides remote direct memory access (RDMA) over PCIe to the local memory of a PCIe device. Using the disclosed techniques may enhance the functionality supported by technologies such as GPUDirect and PeerDirect cited above. For example, in FIG. 1, GPU memory 60 of GPU1 can be accessed over the network via HCA 52.

The previous example application, in which the PCIe device comprises a SSD. For example, RDMA methods as described, for example, in U.S. patent application Ser. Nos. 14/215,097 and 14/215,099, which are incorporated herein by reference, can be adapted to access a SSD storage using the disclosed techniques. This approach may reduce the required number of PCIe to SSD transactions per storage command and therefore reduce the access latency of the SSD. In FIG. 1, the storage of SSD 48 can be remotely accessed in a direct manner via HCA 52.

An application in which an SSD communicates with a GPU over PCIe to transfer data directly between the SSD memory and a GPU memory. For example, SSD 48 in FIG. 1 communicates over PCIe with GPU3.

Direct data transfers over PCIe between the internal memories of two GPUs (e.g., GPU1 and GPU2 in FIG. 1).

Direct data access over PCIe to a Field-Programmable Gate Array (FPGA) device that may comprise an internal memory.

Two SSDs (such as, for example, SSD 48 of FIG. 1) whose memory controllers 74 handle direct data transfers, over PCIe, between their respective storage arrays 78.

More generally, the disclosed techniques are applicable for any pair of PCIe devices, of which at least one device comprises an internal or directly attached memory, wherein the PCIe devices communicate with one another over a PCI or PCIe bus.

The system configuration of FIG. 1, including the various PCIe devices and bus configurations, are exemplary configurations, which are shown purely for the sake of conceptual clarity. Any other suitable system, bus and/or peripheral device configuration can also be used. Elements that are not necessary for understanding the principles of the disclosed embodiments, such as various interfaces, addressing circuits, timing and sequencing circuits and debugging circuits, have been omitted from the figure for clarity.

In the exemplary configuration shown in FIG. 1, CPU 32, system memory 34 and interface 36 are mounted on a motherboard of the system, and GPUs 44, SSD 48 and HCA 52 are implemented as boards or Integrated Circuits (ICs) that connect to PCIe bus 40 using, for example, expansion slots on the motherboard. In other embodiments, one or more of the PCIe devices are mounted on the motherboard itself. In yet other embodiments, PCIe devices may be integrated into the IC of another component, e.g., the CPU IC or the bus controller IC.

In some embodiments, each of GPUs 44, SSD 48 and HCA comprises a processing unit (not shown) that implements the functionality of the device including PCIe connectivity, and an interface for connecting to the PCIe bus. The different elements of GPUs 44, SSD 48 and HCA 52 may be implemented using any suitable hardware, such as in an Application-Specific Integrated Circuit (ASIC) or Field-Programmable Gate Array (FPGA). In some embodiments, some elements of GPUs 44, SSD 48 and HCA 52 can be implemented using software, or using a combination of hardware and software elements.

In some embodiments, the processing unit in GPU 44, SSD 48 and/or HCA 52 comprises a general-purpose processor, which is programmed in software to carry out some of the functions described herein. The software may be downloaded to the processor in electronic form, over a network, for example, or it may, alternatively or additionally, be provided and/or stored on non-transitory tangible media, such as magnetic, optical, or electronic memory.

Exposing Device Addresses to PCI-E Bus

Figure 2A:
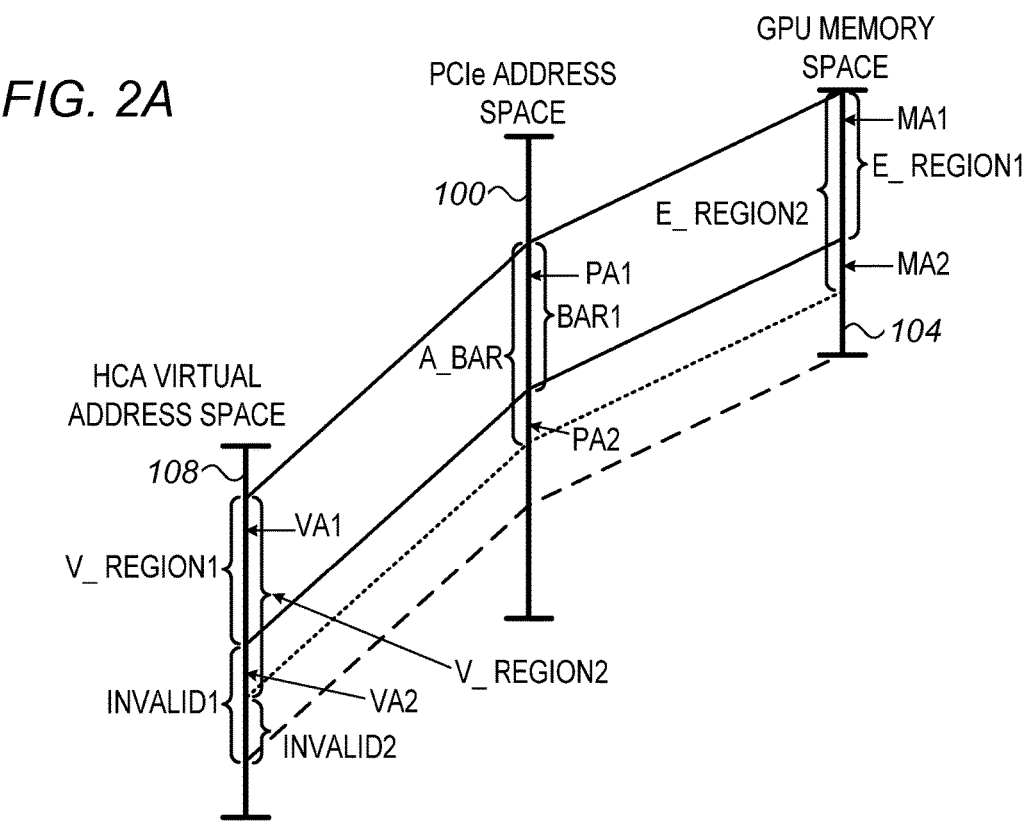
FIGS. 2A and 2B are diagrams that schematically illustrate techniques for dynamic mapping of local memory addresses for direct access via PCIe, in accordance with embodiments that are described herein.
Figure 2B:
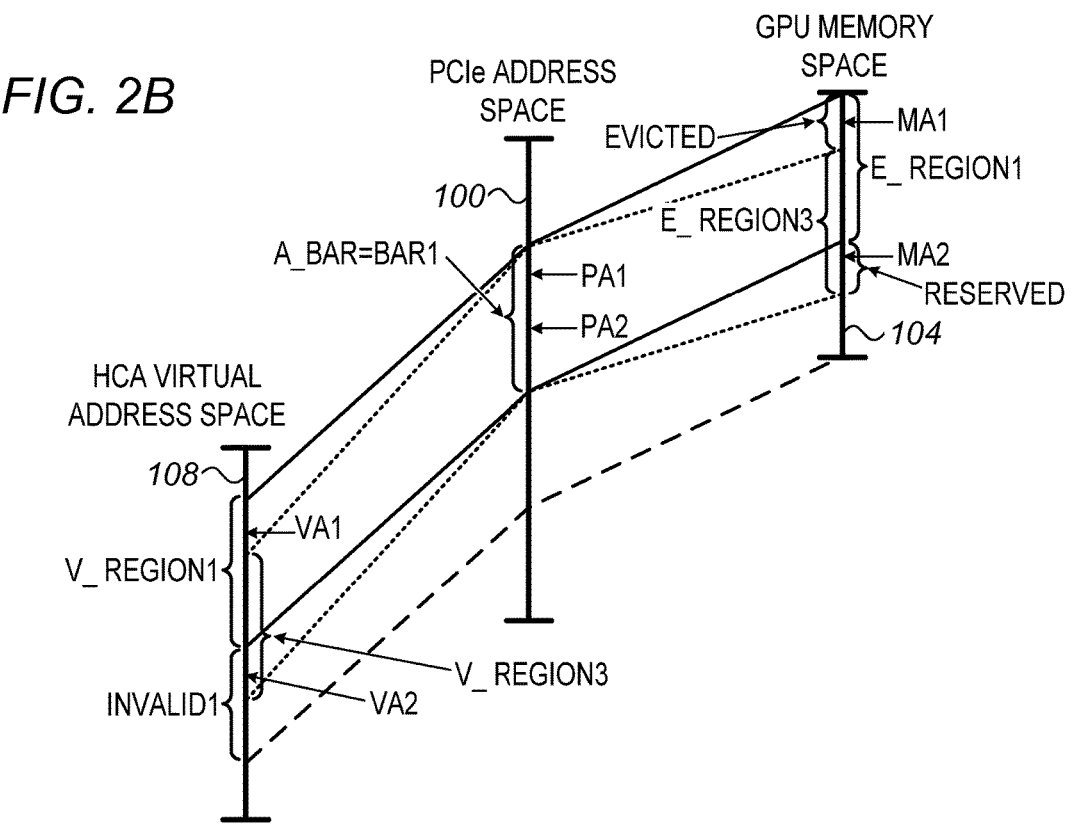

FIGS. 2A and 2B are diagrams that schematically illustrate techniques for dynamic mapping of local memory addresses for direct access via PCIe, in accordance with embodiments that are described herein. Each of FIGS. 2A and 2B depicts three address spaces as vertical line segments. The addresses in the present example relate to system 20 of FIG. 1, in which HCA 52 communicates with GPU1 over PCIe bus 40.

In FIGS. 2A and 2B, an address space 100 comprises the physical address space of bus 40. In addition, address spaces 104 and 108 comprise the internal address space used by GPU1 and the virtual address space used by HCA 52, respectively. In FIGS. 2A and 2B, we assume that the GPU first exposes to the PCIe bus an address range of memory 60 denoted E_REGION1. In the figures, MA1 and MA2 represent memory addresses of GPU memory 60, of which only MA1 is included within E_REGION1.

In some embodiments, CPU 32 allocates to the GPU an address range denoted A_BAR. In FIG. 2A a sub-region of A_BAR that is denoted BAR1 corresponds to E_REGION1. In some embodiments the CPU sets register BAR 70 in GPU1 in accordance with A_BAR, e.g., including the starting address and the size of A_BAR. Additionally, the CPU configures mapping table 64 in the GPU to translate between BAR1 addresses and respective E_REGION1 addresses. Note that in the present example, E_REGION1 is smaller than the full address space that GPU memory 60 supports.

In FIGS. 2A and 2B, an address range denoted V_REGION1 in the virtual address space of HCA 52 corresponds to E_REGION1 of the GPU address space. In some embodiments, HCA 52 translates between virtual addresses in V_REGION1 and physical addresses in BAR1 using HCA mapping table 88. For example, a virtual address VA1 in the virtual address space of HCA 52 corresponds to a physical address PA1 in BAR1, whereas PA1 corresponds to an address MA1 in E_REGION1.

In FIGS. 2A and 2B, the address range that is denoted INVALID1 comprises virtual addresses that have no corresponding addresses in the currently mapped region E_REGION1. In some embodiments, entries in HCA mapping table 88 that have no corresponding mapped addresses in BAR1, E_REGION1 or both are marked as invalid addresses. For example, with respect to E_REGION1, virtual address VA2 comprises an invalid address.

When HCA 52 initiates a direct data transfer to or from GPU memory 60 with reference to a virtual address that belongs to V_REGION1, such as address VA1, the HCA translates VA1 to respective physical address PA1, for example, using HCA mapping table 88. Since address PA1 is currently mapped to MA1 in the local address space of the GPU, MA1 can be accessed by translating PA1 to MA1, e.g., using mapping table 64.

When HCA 52 attempts executing a data transfer with respect to an invalid address such as VA2, HCA 52 may request CPU 32 to change the mapping between BAR1 and addresses in the local address space of the GPU by updating the related mapping tables so that VA2 becomes a valid address that has a corresponding mapped address MA2 in the GPU address space. Address range A_BAR of FIGS. 2A and 2B include a physical address PA2 that translates to VA2 in the virtual address space and to MA2 in the GPU address space. Thus, when PA2 belongs to A_BAR, the HCA can translate VA2 to PA2 and the GPU can translate PA2 to MA2. In an embodiment, CPU 32 updates mapping table 88 in the HCA and mapping table 64 in the GPU including mapping PA2 accordingly.

FIGS. 2A and 2B demonstrate two methods for updating the mapping tables. In FIG. 2A, A_BAR has an available range that includes PA2, and CPU 32 maps A_BAR to range E_REGION2 in the GPU address space that extends E_REGION1, and to a respective region V_REGION2 in the virtual address space that includes VA2.

In FIG. 2B, BAR1 maps the entire A_BAR region and there are no available physical addresses. In this example, CPU 32 re-maps BAR1 to E_REGION3 in the GPU address space including MA2 and to V_REGION3 in the HCA address space including VA2. Following the re-mapping, PA2 in BAR1 corresponds to MA2 in the GPU address space and to VA2 in the virtual address space. In the present example, CPU 32 re-maps BAR1 by exposing some space in addition to range E_REGION1 (i.e., denoted RESERVED in FIG. 2B), and evicting some space from E_REGION1 (i.e., denoted EVICTED in FIG. 2B). After the re-mapping, VA1 is marked as invalid. The CPU may select addresses for eviction using any suitable method. For example, the CPU may select to evict certain addresses using algorithms such as the least recently used (LRU) algorithm. Alternatively, the CPU may select addresses for eviction randomly.

In some embodiments, the CPU evicts addresses when extending E_REGION1 may exceed a predefined size limit of the PCI BAR. In other embodiments, the eviction can be performed independently from reserving additional pages. For example, the evicted addresses may correspond to pages of the local memory that were migrated, for example, to the system memory, SSD or another device. After eviction, e.g., due to page migration, the respective addresses in the related mapping tables should be marked as invalid.

In re-mapping BAR1, CPU 32 updates mapping tables 88 and 64 accordingly. In some embodiments, addresses that were evicted are marked as invalid addresses. Following the re-mapping, when accessing address MA2, HCA 52 translates VA2 to PA2 and the GPU translates PA2 to MA2. Since VA1 is outside V_REGION3, an attempt to access VA1 by the HCA will result in a page fault event, and trigger an update of the mapping tables.

The methods described in FIGS. 2A and 2B are given by way of example, and in alternative embodiments other suitable methods can also be used. For example, although in the figures, the various address ranges are contiguous, in other embodiments, the address range in at least one of the address spaces may be noncontiguous. As another example, although the methods of FIGS. 2A and 2B are described separately these methods may be used in a combined manner. For example, when re-mapping BAR1, the evicted and reserved regions may have different sizes.

Figure 3:
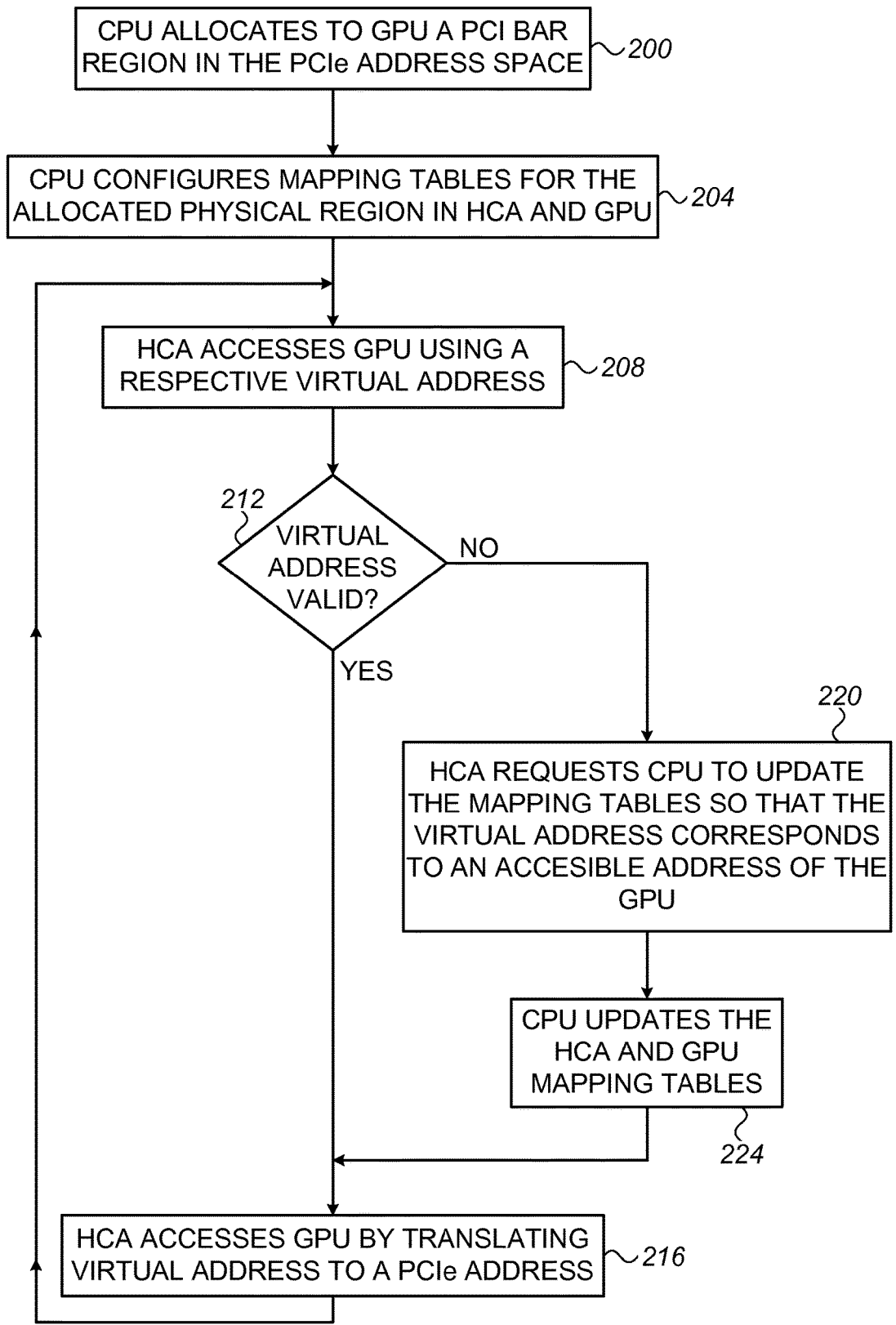
FIG. 3 is a flow chart that schematically illustrates a method for directly accessing the local memory of a device over PCIe, in accordance with an embodiment that is described herein.

FIG. 3 is a flow chart that schematically illustrates a method for directly accessing the local memory of a device over PCIe, in accordance with an embodiment that is described herein. In the method of FIG. 3 we assume a system similar to system 20 in FIG. 1, in which HCA 52 transfers data directly to and from GPU memory 60 of a GPU such as GPU1. The method begins by CPU allocating a PCI BAR to GPU1, i.e., a range of physical addresses, at an allocation step 200. In some embodiments, the CPU allocates the PCI BAR in response to a GPU request to expose a respective range of local addresses to the PCIe bus.

At a mapping configuration step 204, the CPU configures mapping table 88 in the HCA and mapping table 64 in the GPU, in accordance with the region that the GPU requires to expose and the allocated PCI BAR. When configured, tables 88 and 64 can be used for translating between the allocated PCIe addresses and HCA virtual addresses or GPU memory addresses. In alternative embodiments, for example when using ATS, the GPU manages its mapping table without involving the CPU.

At a transfer initiation step 208, the HCA initiates a data transfer to or from the GPU memory at a given virtual address. At a validity checking step 212, the HCA checks whether the given virtual address is valid, i.e., has a corresponding physical address in the PCI BAR. When the virtual address at step 212 is found valid, the HCA accesses the GPU memory directly, at a GPU accessing step 216. The HCA translates the given virtual address to a respective physical address using, for example, mapping table 88. The GPU whose BAR 70 was configured at step 204 recognizes that the GPU memory is the destination of the data transfer and translates the physical address to the internal memory address to complete the transaction.

When at step 212 the given virtual address is found invalid, the HCA requests the CPU to update the mapping between the local addresses and respective physical addresses at an updating step 220. At a mapping updating step 224, the CPU updates mappings tables 88 and 64 using, for example, the methods described above. Following step 224, the method proceeds to step 216 in which the HCA accesses the GPU memory as described above.

When the HCA completes the direct access to GPU memory 60 at step 216 the method loops back to step 208 to apply subsequent direct access transactions.

Figure 4:
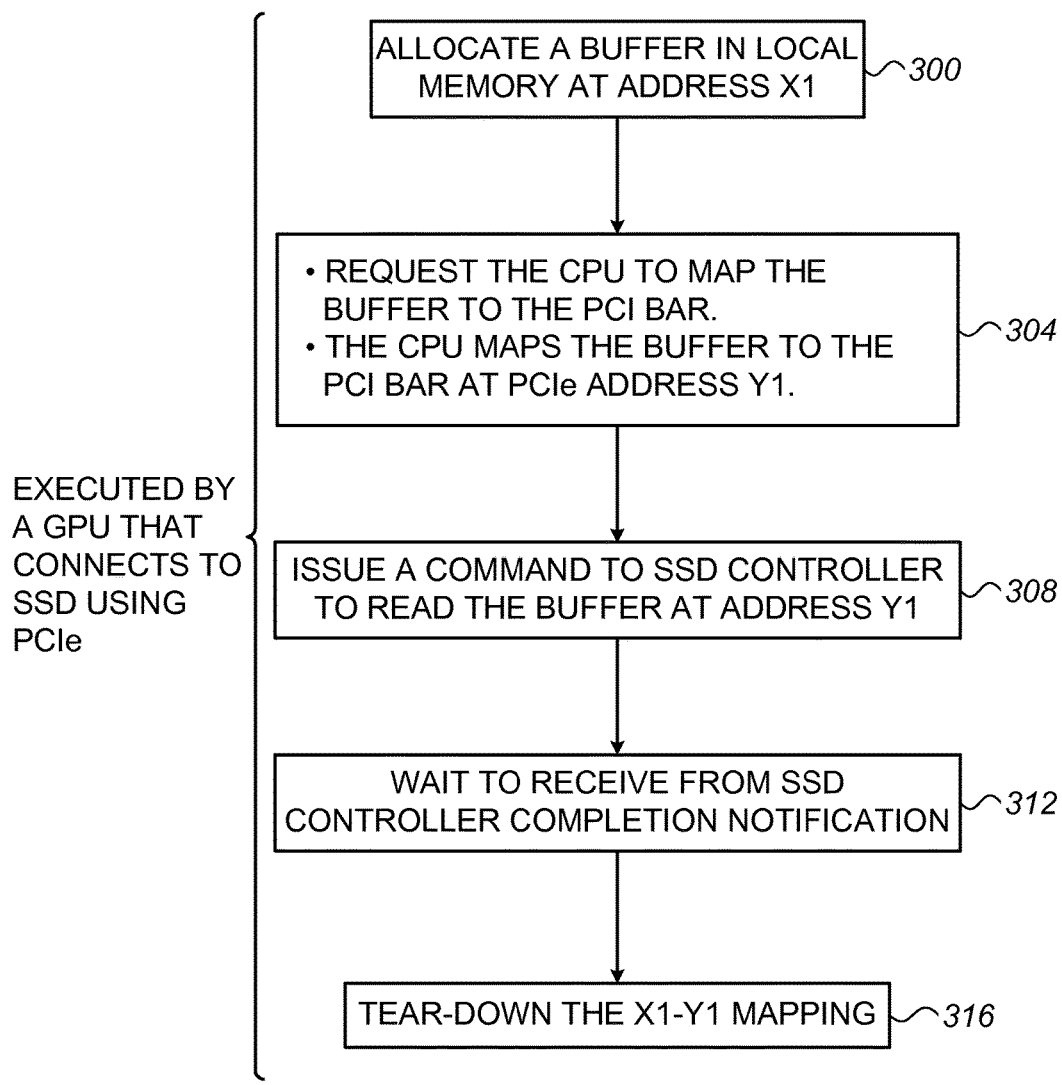
FIG. 4 is a flow chart that schematically illustrates a method for directly accessing the local memory of a device over PCIe, in accordance with another embodiment that is described herein.

FIG. 4 is a flow chart that schematically illustrates a method for directly accessing the local memory of a device over PCIe, in accordance with another embodiment that is described herein. The method of FIG. 4 is executed by GPU 44 whose memory 60 is the destination to be accessed by another PCIe device. In describing the method, we assume that a PCI BAR was allocated to the GPU before the method is executed.

The method begins by the GPU allocating a buffer in its local memory 60 at an address X1 of the internal address space of the GPU, at a buffer allocation step 300. In the present example, the allocated buffer is to be accessed by SSD controller 74. At a requesting step 304, the GPU maps the GPU memory buffer to the PCI BAR of the GPU, possibly by sending an explicit request to the CPU. In the present example, we assume that the CPU allocates a region in the PCI BAR starting at an address Y1. The CPU configures mapping table 64 of the GPU, as well as SSD mapping table 84, in accordance with the allocated range in the PCI BAR. In an embodiment, the request to the CPU includes the local memory address (i.e., X1) and the respective address in the volatile memory of the SSD, and therefore the configuration of mapping table 84 may be skipped.

At a command issuing step 308, the GPU issues a command to SSD 48, requesting SSD controller 74 to read the memory buffer at PCIe address Y1. The SSD controller then directly reads the GPU memory buffer by accessing respective addresses in the PCI BAR. The SSD translates the PCIe addresses to virtual addresses e.g., using SSD mapping table 84, and stores the read data in volatile memory 82. Methods for transferring data between volatile memory 82 and nonvolatile memory 78 are described further below.

At a waiting step 312, the GPU waits to receive from the SSD a notification that the SSD has completed reading the GPU buffer. When receiving the completion notification, the GPU proceeds to a tear-down step 316, in which the GPU requests the CPU to tear-down the mapping of the GPU memory buffer to the PCI BAR by removing respective entries in GPU mapping table 64 and SSD mapping table 84, and the method then terminates.

In a variant embodiment, the GPU mapping tables already include mappings of the GPU logical function's address space to point to the PCI BAR of the SSD. In this case, the GPU doesn't update the GPU local mapping, but rather performs a DMA write operation to the volatile memory of the SSD, followed by triggering an SSD operation to store the data in the flash array.

In another embodiment, the GPU may request from the CPU the physical address for accessing data that resides on the SSD. If the data is available in the volatile memory, the CPU updates the GPU with the appropriate mapping. If the data is not available in the volatile memory, the CPU allocates sufficient space in the volatile memory of the SSD, queues a read request on the SSD, and once the read request is completed, the CPU updates the GPU mapping table with mapping to the address in the volatile memory that contains the data.

In some embodiments, the method of FIG. 4 is executed wherein HCA 52 replaces SSD 48. In such embodiments, the GPU sends a command to the HCA to update mapping table 88 to include entries for mapping between virtual addresses and respective physical addresses in the region in the PCI BAR that was allocated to the memory buffer of the GPU.

Implementation Details

We now describe implementation details that can be used in several embodiments, including variants of the embodiments described above.

In some embodiments, a PCIe device (e.g., HCA 52) translates between its internal addresses and the PCIe bus addresses using an input/output memory mapping unit (IOMMU). In other embodiments, the PCIe device may perform address translation and resolution using a PCI address translation service (ATS). In some embodiments, tags such as process address space ID (PASID) tags, are used for specifying the addresses to be translated as belonging to the virtual address space of a specific process.

In some embodiments, address resolution may be implemented by each of the CPU, GPU, HCA or in combination of at least two of these elements. For example, the HCA may attempt to resolve a given address, and when concluding that the address in question resides in the GPU memory, the HCA requests the GPU to map the relevant addresses of the GPU memory to the PCI BAR, using direct device-to-device (i.e., HCA-to-GPU in this example) communication. For example, the HCA may send to the GPU an ATS-PRI (Address Translation Service-Page Request Interface) PCIe message. The GPU then provides to the HCA the entries to be added to the HCA mapping table.

As noted above, when re-mapping regions of the PCI BAR, some local addresses that are mapped to the PCI BAR may be evicted, e.g., due to PCI BAR space constraints. In alternative embodiments, eviction of local addresses is required for other reasons. For example, a storage controller such as SSD controller 74 may expose a memory buffer of volatile memory 82 by mapping the buffer to a respective region of the PCI BAR, but reclaim the buffer or part thereof when needed for other purposes. Such reclamation will trigger an invalidation of all respective mapping of the buffer in mapping tables of other PCIe devices, i.e., by marking the relevant virtual address space as invalid in the mapping table of relevant PCIe devices, such as HCA mapping table 88 (possibly using CPU coordination).

In some embodiments, the mapping tables are configured (e.g., by CPU 32) before another device actually attempts direct access to the local memory of the device. Using such a pre-fetching mechanism may reduce the accessing latency to the local memory.

In some embodiments, instead of updating the mapping between the PCI BAR and local addresses to include inaccessible addresses in the address space of a PCIe device (e.g., a GPU), the device may rearrange the data stored in its local memory so that the requested data is stored in addresses are currently mapped to the PCI BAR. Such implementation may require modifications to the code executed by the GPU, such as using pointers that are updated as data is moved. This technique is especially relevant for storage devices, such as NVMe or SSDs.

In some embodiments, the number of concurrent different physical address that a PCIe device supports is limited. Since over time dynamic mapping of local addresses to the PCI BARs tends to make the PCIe address space highly fragmented, the requested number of concurrent mappings per device may exceed the supported limit. In an embodiment, the mechanism that maps local addresses to respective PCI BARs in the PCIe address space employs defragmentation techniques. In some embodiments, such allocation mechanism may organize the mappings in a minimal number of contiguous ranges in the PCIe address space.

Direct Access to SSD

In an embodiment, CPU 32 or a peripheral device such as HCA 52 or GPU 44 communicate with SSD 48 over PCIe. As noted above, the embodiments disclosed above can be used for directly accessing volatile memory 82 whereas SSD controller 74 handles the SSD storage.

In an embodiment, the SSD manages its storage using a virtual or logical address space. Mapping table 84 translates between the addresses of volatile memory 82 and respective PCIe addresses. The SSD controller handles the associations between the virtual addresses and respective addresses of volatile memory 82, as well as mapping virtual addresses to respective locations used in storage array 78. In some embodiments, the physical addresses allocated to the SSD in the PCI BAR have a 1:1 mapping to respective addresses of the volatile memory of the SSD. In such embodiments, mapping table 84 may be omitted and address translation should be performed only at the peer device.

In some embodiments, the SSD controller caches data from array 78 in memory 82 for direct reading. Note that the size of memory 82 is typically much smaller than the size of flash storage array 78, and therefore the SSD controller can mirror only a partial subset of the data stored in storage array 78 into memory 82. Alternatively or additionally, memory 82 may store data independently of array 78 and expose addresses related to this data to the PCIe bus.

Volatile memory 82 serves as an intermediate buffer for DMA operations. Thus, when writing data to array 78, the data is first written to memory 82 using DMA, and then copied by the SSD controller to array 78. When reading data from array 78, SSD controller 74 first fetches the data from array 78 to volatile memory 82, and the data is then delivered from memory 82 to its destination using DMA. For example, in one embodiment the SSD controller signals to a remote device when the data is ready for direct reading from volatile memory 82, e.g., by indicating a respective address in the BAR from which to read. In response to the signaling, the remote device performs a DMA read operation, accordingly. In another embodiment, when the requested data is available in the volatile memory, the SSD controller may perform a DMA write operation toward the peer device. Fetching the data from the flash array may be skipped when the requested data already resides in memory 82. In some embodiments, SSD mapping table 84 includes an indication of whether the data stored at a given virtual address is available in memory 82.

In some embodiments, when reading data that is not currently available in volatile memory 82, the SSD controller fetches the missing data (e.g., a memory block that includes the missing data) from array 78 into volatile memory 82. In an embodiment, the peer device indicates to the SSD controller that the peer device attempts to access a logical address with reference to data that is currently not cached in the volatile memory 82 and therefore needs to be fetched from the nonvolatile array. The SSD controller then updaters SSD mapping table 84 accordingly, and informs the data requester that the data is now available for read. Alternatively or additionally, the mapping table in the peer device is also updated. In some embodiments, the SSD controller writes the fetched data in memory 82 over previously fetched data. In this case the SSD controller may write the data previously fetched back to array 87 and only then fetch the missing data.

The embodiments described above are given by way of example, and other suitable embodiments can also be used. For example, the local memory of a PCIe device can be managed in various granularities. In an example embodiment, the local memory is organized in memory pages of, e.g., 64 Kbytes. Alternatively, other suitable granularity levels can also be used.

Although in the embodiments described above, allocating the PCI BAR and configuring the mapping tables is attributed to the CPU, this is not mandatory. In alternative embodiments these tasks can be carried out by a centralized element attached to the PCIe bus other than the CPU. Further alternatively, these tasks can be distributed between the CPU and involved devices.

Although the embodiments described above, refer mainly to accessing a local memory over PCIe, the disclosed techniques are applicable also in accessing functionalities other than memory or storage by mapping the device's local address space to the PCIe address space.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    allocating, to a first device coupled to a bus that operates in accordance with a bus address space, multiple bus addresses of the bus address space;
    providing direct access over the bus to a local address space of the first device by defining a mapping between at least some of the addresses of the local address space and the allocated bus addresses of the bus address space;
    in response to detecting that a second device requires to access a given local address in the local address space of the first device that is not currently mapped by the defined mapping to any of the allocated bus addresses, modifying the defined mapping to also map the given local address of the first device to a respective bus address among the allocated bus addresses; and
    accessing the given local address of the first device directly, by the second device, using the modified mapping of the defined mapping.

2. The method according to claim 1, wherein modifying the mapping comprises re-mapping one or more addresses of the local address space that were previously mapped to the allocated bus addresses of the bus address space.

3. The method according to claim 1, wherein accessing the given local address comprises translating an allocated bus address in the bus address space that is mapped to the given local address by the modified mapping.

4. The method according to claim 1, wherein the second device uses a second address space that includes a second address corresponding to a respective intermediate address in the bus address space that is mapped to the given local address, wherein accessing the given local address comprises translating the second address to the intermediate address and translating the intermediate address to the given local address using the modified mapping.

5. The method according to claim 4, wherein translating at least one of the second address and the intermediate address comprises holding a respective mapping table.

6. The method according to claim 4, wherein translating at least one of the second address and the intermediate address comprises requesting translation from an address translation service (ATS).

7. The method according to claim 1, wherein accessing the given local address comprises sending, over the bus, a command from the first device to the second device indicating that the given local address is mapped within the modified mapping and ready for access.

8. The method according to claim 1, wherein the second device comprises a network adapter that communicates with a peer network adapter over a communication network, wherein the peer network adapter communicates with the first device using remote direct memory access (RDMA).

9. The method according to claim 1, wherein the first device comprises a first local memory that is accessed using the local address space, and the second device comprises a second local memory, wherein accessing the given local address comprises transferring data directly between the first local memory and the second local memory.

10. Apparatus, comprising:
    first and second devices, which are configured to communicate over a bus in accordance with a bus address space, wherein multiple bus addresses of the bus address space are allocated to the first device,
    wherein the first device is configured to provide direct access over the bus to a local address space by defining a mapping between at least some of the addresses in the local address space and the allocated bus addresses of the bus address space,
    and wherein, in response to detecting by the first device or the second device that the second device requires to access a given local address in the local address space of the first device that is not currently mapped by the defined mapping to any of the allocated bus addresses, the first device is configured to modify the mapping to also map the given local address to a respective bus address among the allocated bus addresses, and the second device is configured to access the given local address directly, using the modified mapping of the defined mapping.

11. The apparatus according to claim 10, wherein the first device is configured to modify the mapping by re-mapping one or more addresses of the local address space that were previously mapped to the allocated bus addresses of the bus address space.

12. The apparatus according to claim 10, wherein the first device is configured to translate an allocated bus address in the bus address space that is mapped to the given local address by the modified mapping.

13. The apparatus according to claim 10, wherein the second device uses a second address space that includes a second address corresponding to a respective intermediate address in the bus address space that is mapped to the given local address, wherein the second device is configured to access the given local address by translating the second address to the intermediate address, and wherein the first device is configured to translate the intermediate address to the given local address using the modified mapping.

14. The apparatus according to claim 13, wherein at least one of the first device and the second device is configured to translate the second address or the intermediate address, respectively, by holding a respective mapping table.

15. The apparatus according to claim 13, wherein at least one of the first device and the second device is configured to translate the second address or the intermediate address, respectively, by requesting translation from an address translation service (STA).

16. The apparatus according to claim 10, wherein the first device is configured to send a command to the second device, over the bus, indicating that the given local address is mapped within the modified mapping and ready for access.

17. The apparatus according to claim 10, wherein the second device comprises a network adapter that communicates with a peer network adapter over a communication network, wherein the peer network adapter communicates with the first device using remote direct memory access (RDMA).

18. The apparatus according to claim 10, wherein the first device comprises a first local memory that is accessed using the local address space, and the second device comprises a second local memory, wherein the first and second devices are configured to transfer data directly between the first local memory and the second local memory.

19. A method, comprising:

communicating between a first device and a second device over a bus that operates in accordance with a bus address space, and allocating for the first device multiple bus addresses of the bus address space, wherein the first device stores data in a storage area in accordance with a logical address space and provides direct access over the bus to a local memory of the first device by defining a mapping between at least some of the addresses of the local memory and the allocated bus addresses of the bus address space;

in response to indicating, by the second device, that the second device requires to access a logical address that stores requested data that resides in the storage area but is not currently available in the local memory, fetching the requested data from the logical address to a local address of the local memory that is mapped within the mapping to a respective bus address allocated in the bus address space; and accessing the local address directly, by the second device, using the mapping.

20. The method according to claim 19, wherein fetching the requested data comprises indicating to the second device a physical address of the bus address space corresponding to the local address, when the requested data is available for read in the local address.

21. The method according to claim 19, wherein fetching the requested data comprises writing, prior to fetching the requested data, data that is currently stored in the local address to the storage area.

22. The method according to claim 19, wherein defining the mapping comprises fetching data from a given logical address of the storage area to the local address and associating between the local address and the given logical address.

23. The method according to claim 19, wherein the first device comprises a storage device, and wherein the storage area comprises a nonvolatile memory.

24. Apparatus, comprising:

first and second devices, which are configured to communicate over a bus in accordance with a bus address space, wherein multiple bus addresses of the bus address space are allocated for the first device, wherein the first device is configured to store data in a storage area in accordance with a logical address space and to provide direct access over the bus to a local memory, by defining a mapping between at least some of the addresses of the local memory and the allocated bus addresses of the bus address space, and wherein, in response to indicating, by the second device, that the second device requires to access a logical address that stores requested data that resides in the storage area but is not currently available in the local memory, the first device is configured to fetch the requested data from the logical address to a local address of the local memory that is mapped within the mapping to a respective bus address allocated in the bus address space, and the second device is configured to access the local address directly, using the mapping.

25. The apparatus according to claim 24, wherein the first device is configured to indicate to the second device a physical address of the bus address space corresponding to the local address, when the requested data is available for read in the local address.

26. The apparatus according to claim 24, wherein the first device is configured to write, prior to fetching the requested data, data that is currently stored in the local address to the storage area.

27. The method according to claim 24, wherein the first device is configured to define the mapping by fetching data from a given logical address of the storage area to the local address and associating between the local address and the given logical address.

28. The method according to claim 24, wherein the first device comprises a storage device, and wherein the storage area comprises a nonvolatile memory.

\* \* \* \* \*